United States Patent
Tatarkiewicz

(10) Patent No.: US 10,613,012 B1
(45) Date of Patent: Apr. 7, 2020

(54) APPARATUS AND METHOD FOR OBSERVATION OF MICROSCOPIC MOVEMENTS AND COUNTING OF PARTICLES IN COLLOIDS

(71) Applicant: HORIBA Instruments Incorporated, Irvine, CA (US)

(72) Inventor: Jan J. Tatarkiewicz, San Diego, CA (US)

(73) Assignee: HORIBA INSTRUMENTS INCORPORATED, Irvine, CA (US)

( * ) Notice: Subject to any disclaimer, the term of this patent is extended or adjusted under 35 U.S.C. 154(b) by 0 days.

(21) Appl. No.: 16/668,311

(22) Filed: Oct. 30, 2019

Related U.S. Application Data

(60) Provisional application No. 62/916,577, filed on Oct. 17, 2019.

(51) Int. Cl.
*G01N 15/02* (2006.01)
*B82Y 35/00* (2011.01)
*G01N 21/25* (2006.01)

(52) U.S. Cl.
CPC .......... *G01N 15/0205* (2013.01); *B82Y 35/00* (2013.01); *G01N 21/253* (2013.01)

(58) Field of Classification Search
CPC ........... B82Y 30/00; B82Y 5/00; B82Y 10/00; B82Y 15/00; B82Y 20/00; G01N 33/54346; G01N 21/658; G01N 33/54373; G01N 21/554; G01N 2201/06113; G01N 15/0205; G01N 21/47; G01N 21/648; G01N 21/53; G01N 21/645; G01N 2201/068; G01N 33/6803; G01N 15/1436; G01N 15/1459; G01N 15/1468; G01N 15/1475; G01N 2015/0046; G01N 2015/1472; G01N 2015/1486; G01N 2015/1493; G01N 2021/4721; G01N 2021/4764; G01N 2021/6421; G01N 2021/6439; G01N 2021/6441; G01N 21/49; G01N 21/6486; G01N 2201/062; G01N 33/58; G01N 15/0211; G01N 17/008; G01N 2021/4711; G01N 2021/4719; G01N 2021/4726; G01N 2021/4792; G01N 2021/6463; G01N 21/4738; G01N 21/51; G01N 21/64; G01N 21/94; G01N 2201/061; G01N 2201/0612; G01N 2201/08; G01N 2201/1224; G01N 2458/40; G01N 33/54313; G01N 33/54326; G01N 33/569; G01N 33/585; G01N 33/587; G02B 5/3033
See application file for complete search history.

(56) References Cited

U.S. PATENT DOCUMENTS

| | | | | |
|---|---|---|---|---|
| 4,157,871 A | * | 6/1979 | Anderson | G01N 21/47 356/341 |
| 4,433,239 A | * | 2/1984 | Thompson | G01V 8/02 250/255 |
| 4,482,251 A | * | 11/1984 | Saylor | G01N 21/253 356/414 |

(Continued)

*Primary Examiner* — Michael P Stafira
(74) *Attorney, Agent, or Firm* — Manuel de la Cerra

(57) ABSTRACT

The disclosure provides for a novel optical chopper that can rapidly change the intensity of light incident on a colloid under investigation. This helps recording various sizes of nanoparticles that scatter light with very different efficiencies (effective cross-sections), typically orders of magnitude different.

24 Claims, 4 Drawing Sheets

(56) References Cited

U.S. PATENT DOCUMENTS

| | | | | |
|---|---|---|---|---|
| 4,586,819 | A * | 5/1986 | Tochigi | G01N 21/65 356/301 |
| 5,247,345 | A * | 9/1993 | Curtis | G01N 21/255 356/418 |
| 5,386,295 | A * | 1/1995 | Switalski | G01J 3/02 250/458.1 |
| 6,180,415 | B1 * | 1/2001 | Schultz | B82Y 30/00 356/301 |
| 2003/0082516 | A1 * | 5/2003 | Straus | G01N 33/56916 435/4 |
| 2003/0127609 | A1 * | 7/2003 | El-Hage | G01N 21/253 250/574 |
| 2005/0033127 | A1 * | 2/2005 | Ciurczak | A61B 5/14532 600/316 |
| 2005/0094147 | A1 * | 5/2005 | Yaroslaysky | A61B 5/0059 356/417 |
| 2006/0007531 | A1 * | 1/2006 | Korengut | G01N 21/8806 359/362 |
| 2006/0132779 | A1 * | 6/2006 | Hunt | G01J 1/02 356/418 |
| 2007/0246652 | A1 * | 10/2007 | Gopalsami | G01J 3/42 250/336.1 |
| 2009/0038794 | A1 * | 2/2009 | Yamate | E21B 47/123 166/254.2 |
| 2011/0085166 | A1 * | 4/2011 | Ou-Yang | B01L 3/502761 356/338 |
| 2015/0056710 | A1 * | 2/2015 | Reed | G01N 15/0211 436/86 |

* cited by examiner

APPARATUS AND METHOD FOR OBSERVATION OF MICROSCOPIC MOVEMENTS AND COUNTING OF PARTICLES IN COLLOIDS

RELATED APPLICATIONS

This application claims priority to U.S. Patent Application 62/916,577, filed on Oct. 17, 2019, the disclosure of which is herein incorporated by reference in its entirety.

This is related to U.S. patent application Ser. No. 16/362,636 filed on Mar. 23, 2019, titled "IMPROVED METHOD FOR DETERMINING THE SIZE OF NANOPARTICLES IN A COLLOID"; U.S. patent application Ser. No. 16/391,870, filed on May 23, 2019, titled "IMPROVED METHOD FOR DETERMINING THE SIZE OF NANOPARTICLES IN A COLLOID"; U.S. patent application Ser. No. 16/576,501, filed on Sep. 19, 2019, titled "IMPROVED METHOD FOR DETERMINING THE SIZE OF NANOPARTICLES IN A COLLOID"; U.S. patent application Ser. No. 16/431,274, filed on Jun. 4, 2019, titled "APPARATUS AND METHOD FOR THREE-DIMENSIONAL IMAGE ANALYSIS FOR PARTICLE VOLUME DETERMINATION"; U.S. patent application Ser. No. 16/528,044, filed on Jul. 31, 2019, titled "APPARATUS AND METHOD FOR ANALYZING PARTICLES"; U.S. Patent Application No. 62/357,777, filed on Jul. 1, 2016, titled "METHOD FOR CALIBRATING INVESTIGATED VOLUME FOR LIGHT SHEET BASED NANOPARTICLE TRACKING AND COUNTING APPARATUS"; U.S. Patent Application No. 62/372,025, filed on Aug. 8, 2016, titled "METHOD FOR CALIBRATING INVESTIGATED VOLUME FOR LIGHT SHEET BASED NANOPARTICLE TRACKING AND COUNTING APPARATUS"; U.S. Patent Application No. 62/421,585, filed on Nov. 14, 2016, titled "METHOD FOR CALIBRATING INVESTIGATED VOLUME FOR LIGHT SHEET BASED NANOPARTICLE TRACKING AND COUNTING APPARATUS", U.S. Patent Application No. 62/241,354, filed on Oct. 14, 2015, titled "APPARATUS FOR MEASUREMENTS OF GROWTH OR DISSOLUTION KINETICS OF COLLOIDAL NANOPARTICLE"; U.S. patent application Ser. No. 15/293,180, filed on Oct. 16, 2016, titled "APPARATUS AND METHOD FOR MEASUREMENT OF GROWTH OR DISSOLUTION KINETICS OF COLLOIDAL PARTICLES"; U.S. patent application Ser. No. 15/018,532, filed on Feb. 8, 2016, titled "MULTI-CAMERA APPARATUS FOR OBSERVATION OF MICROSCOPIC MOVEMENTS AND COUNTING OF PARTICLES IN COLLOIDS AND ITS CALIBRATION"; U.S. patent application Ser. No. 15/194,823, filed on Jun. 28, 2016, titled "SPECIAL PURPOSE CUVETTE ASSEMBLY AND METHOD FOR OPTICAL MICROSCOPY OF NANOPARTICLES IN LIQUIDS" issued on Jan. 10, 2017 as U.S. Pat. No. 9,541,490; U.S. patent application Ser. No. 14/730,138, filed on Jun. 3, 2015, titled "NANOPARTICLE ANALYZER", issued on May 9, 2017 as U.S. Pat. No. 9,645,070; U.S. patent application Ser. No. 15/399,679, filed on Jan. 5, 2017, titled "SPECIAL PURPOSE CUVETTE ASSEMBLY AND METHOD FOR OPTICAL MICROSCOPY OF NANOPARTICLES IN LIQUIDS"; U.S. patent application Ser. No. 15/594,967, filed on May 15, 2017, titled "SPECIAL PURPOSE CUVETTE ASSEMBLY AND METHOD FOR OPTICAL MICROSCOPY OF NANOPARTICLES IN LIQUIDS"; and U.S. Patent Application No. 62/187,391, filed on Jul. 1, 2015, titled "SPECIAL PURPOSE CUVETTE ASSEMBLY AND METHOD FOR OPTICAL MICROSCOPY OF NANOPARTICLES IN LIQUIDS"; the disclosures of all of which are herein incorporated by reference in their entirety.

TECHNICAL FIELD

The present invention relates to a system for detecting electromagnetic radiation, and more particularly to the observation of nanoparticles in liquid samples using a microscope equipped with digital video cameras/sensors.

BACKGROUND

Nanoparticles are ubiquitous, by far the most abundant particle-like entities in natural environments on Earth, and are widespread across many applications associated with human activities. There are many types of naturally occurring nanoparticles and man-made (engineered) nanoparticles. Nanoparticles occur in air, aquatic environments, rainwater, drinking water, bio-fluids, pharmaceuticals, drug delivery and therapeutic products, and in a broad range of many industrial products. Nanoparticles usually occur within polydisperse assemblages, which are characterized by co-occurrence of differently-sized particles.

Given the widespread usage of nanoparticles, the ability to control and accurately characterize their properties may be useful to many applications. Conventional methods for measuring nanoparticle properties may be inaccurate for polydisperse samples of mixed nanoparticle sizes, which are common in many applications. Some of these conventional approaches take measurements on an ensemble of a large number of nanoparticles within a sample. Because the light scattered from all nanoparticles is measured simultaneously, it may be difficult to resolve the nanoparticles into their constituent sizes when there is a range of particle sizes. Other approaches fail to account for the large differences in the intensity of the scattered light produced by differently-sized nanoparticles across the range of nanoparticle sizes. In these approaches, the low scattering signals from small nanoparticles may be undetected, or the high scattering signals from larger nanoparticles, can obscure the signals from smaller nanoparticles. As a result of these deficiencies, the concentration of nanoparticles of any given size, and hence the entire size distribution, can be subject to unknown error.

These methods of detecting nanoparticles are commonly referred as dark field microscopy. The instrument to perform such an analysis typically comprises a small cell (for example, a cuvette) that enables illumination of a liquid with a precisely-defined, narrow light sheet and observation of scattered light from the nanoparticles, usually at a 90-degree angle relative to the light sheet plane. In other words, the direction of observation is perpendicular to the direction of the plane of illumination. Different sizes of particles can be visualized via the camera capturing light scattered by particles, with images having different sizes and intensities (various brightness of pixels) depending on the size of the particles. But as noted above, recording images of light scattered by particles of mixed sizes coexisting in a solution remains somewhat problematic, due to the huge difference in the amount of light scattered by particles of different sizes. Specifically, the intensity of scattered light depends very strongly on particle size, changing by many orders of magnitude between 10 nm and 1000 nm diameter nanoparticles, for instance. This problem is also encountered in other areas of photography and videography and is commonly called High Dynamic Range (HDR) imaging. What has been needed is an improved system and method that overcomes the problems that tend to be inherent in dark field microscopy systems.

It is well known that the intensity of scattering of light with wavelengths comparable to the size of scattering particles (for visible light wavelengths that are between 400 nm and 700 nm) depends in a complicated way on the particle's size. See Mie scattering, G. Mie 1908 Annalen der Physik 330(3) pp. 377-445. The intensity varies vastly by orders of magnitude when the size of particles changes just by a factor of 10: for particles smaller than about 100 nm, this dependence is proportional to $d^6$; that is, scattering cross-section drops as the sixth power of particle's diameter. When one deals with the highly polydisperse colloid that contains particles of many different sizes, visualization of all such particles is problematic when one uses a simple monochromatic light source with a fixed intensity. Either small particles are not visible when the large ones are scattering not too much light to not blind (oversaturate) the camera, or, when one uses much stronger light source that enables visualization of small particles, images of large ones are highly overexposed and typically have very irregular contours that are hard to track in time (finding a center of such irregular shapes is very complicated and time consuming, not practical for computerized processing).

To solve the problem of wildly varying scattered light intensities, in the inventor's past patent applications, the inventor used multiple lasers with different colors of beams and different intensities of emitted light. The images were recorded by a color video camera if all lasers were working simultaneously (U.S. Pat. No. 9,645,070), or by greyscale camera if lasers were triggered sequentially (U.S. Pat. No. 10,161,852).

But even these systems could overly excite the particles under investigation, leading to misestimating the particle size. For example, in FIG. 1 of U.S. Pat. No. 9,541,490 an apparatus is shown with one laser and a cylindrical lens with focal length of 50 mm that squeezes a light beam emerging from a laser aperture (typically 2 mm×2 mm or circular shape with diameter of about 1 mm). An additional objective with power 5x makes a laser sheet inside the cuvette with a thickness of about 50 microns. If the applied laser has a maximal power of 1 W at aperture, then taking into account losses in the abovementioned optical system, one obtains about 400 mW of light power inside the cuvette, with the cross-section of the laser sheet having dimensions of the already-mentioned 50 microns by about 400 microns. This results in a laser light intensity of about 2 kW/cm$^2$, which is a considerable power density. For comparison, the so-called solar constant, or intensity of solar illumination on the surface of Earth, is about 0.136 W/cm$^2$ or about 15,000 times less intensity than in the described laser sheet. A special microscope with a long working distance (LWD) objective allows for the observation of light sheet deep inside the cuvette, mitigating somewhat the thermal eddies formed by the intense energy from the laser. Indeed, that is why the '490 Patent discloses a special insert, to mitigate the thermal convection of the colloid due to evaporation on the surface.

What is needed, therefore, is an improved system that overcomes these problems and allows for fast intensity changes that can be synchronized to a sensor's frame rate. Ideally, the system should be simple and easy to manufacture, with very few elements forming changeable light sheet thus lowering the cost of manufacturing and making use and servicing simple.

SUMMARY

This disclosure provides a system for determining the particle sizes within a colloid. The system includes a light source constructed to direct a beam of electromagnetic radiation at a specimen chamber, wherein the chamber is constructed to allow a portion of the beam to scatter when illuminating particles within the chamber. A sensor is positioned to detect the scatter of the beam. An optical chopper is positioned between the specimen chamber and the light source. The chopper includes a rotation structure with a first filter and a second filter. The first filter permits a different amount or a different type of electromagnetic radiation to pass there through than the second filter. A motor rotates the rotation structure, and a synchronization mark or structure indicates the rotational position of the rotation structure. As the rotation structure rotates, the beam of electromagnetic radiation alternates between passing through the first filter and the second filter. A detector detects the position of the synchronization mark or structure. A processor is connected to the light source, sensor, detector, and the optical chopper. The processor perform the following steps: (A) activate the light source, (B) activate the motor; (C) detect the synchronization mark or structure; (D) synchronize the frame rate of the sensor based on the synchronization mark or structure detection; and (E) capture a plurality of images from the sensor.

Step (D) may also include synchronizing the frame rate of the sensor, such that a first set of images from the plurality corresponds to the detection of the scatter of the beam passing through the first filter, and a second set of images from the plurality corresponds to the detection of the scatter of the beam passing through the second filter. The processor can then find and track particles based on the first set of images and find and track particles based on the second set of images. And based on the tracking of the particles, the processor can determine the sizes of the particles.

The rotational structure may have more than two filters, each of which permits a different amount or type of electromagnetic radiation to pass through, and as the rotation structure rotates, the beam of electromagnetic radiation alternates between passing through each of the filters. The light source may be monochromatic, and the filters may be intensity filters. The light source may be polychromatic, and the filters may be chromatic filters.

In another embodiment, the system includes a light source constructed to direct a beam of electromagnetic radiation at a specimen chamber wherein the chamber is constructed to allow a portion of the beam to scatter when illuminating particles within the chamber. A sensor is positioned to detect the scatter of the beam. An optical chopper is positioned between the specimen chamber and the light source. The chopper includes a rotation structure with a first filter and a second filter. The first filter permits a different amount of electromagnetic radiation to pass there through than the second filter. A motor rotates the rotation structure, and a synchronization mark or structure indicates the rotational position of the rotation structure. As the rotation structure rotates, the beam of electromagnetic radiation alternates between passing through the first filter and the second filter. A detector detects the position of the synchronization mark or structure. A processor is connected to the light source, sensor, detector, and the optical chopper. The processor perform the following steps: (A) activate the light source; (B) activate the motor; (C) detect the synchronization mark or structure; (D) capture an image or images from the sensor when the light beam is passing through the first filter; (E)

capture an image or images from the sensor when the light beam is passing through the second filter; (F) repeat steps (D) and (E) until the expiration of a time period; (G) extract the images from step (D) into a first extracted image file; (H) extract the images from step (E) into a second extracted image file; (I) determine the size of particles within the first extracted image file by tracking the motion of the particles within the first extracted image file; and (J) determine the size of particles within the second extracted image file by tracking the motion of the particles within the second extracted image file.

The first filter may allow for the transmission of greater than 80% of the light beam intensity, and the second filter may allow for the transmission of much less than 80% of the light beam intensity, e.g. 50% or even only 10% of the light intensity.

The system may have an imaging objective that focuses the scattered portion of the beam onto the sensor, and that objective may be part of a microscope. The sensor may be a black and white camera, and the light source may be a laser. The system may have a light sheet former that forms the beams into a sheet of electromagnetic radiation directed at the specimen chamber.

The optical chopper may have a locking structure to maintain the rotational position of the rotation structure, and that structure may be a magnet, for example.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. It will be understood that certain components and details may not appear in the figures to assist in more clearly describing the invention.

DETAILED DESCRIPTION

Figure 1:
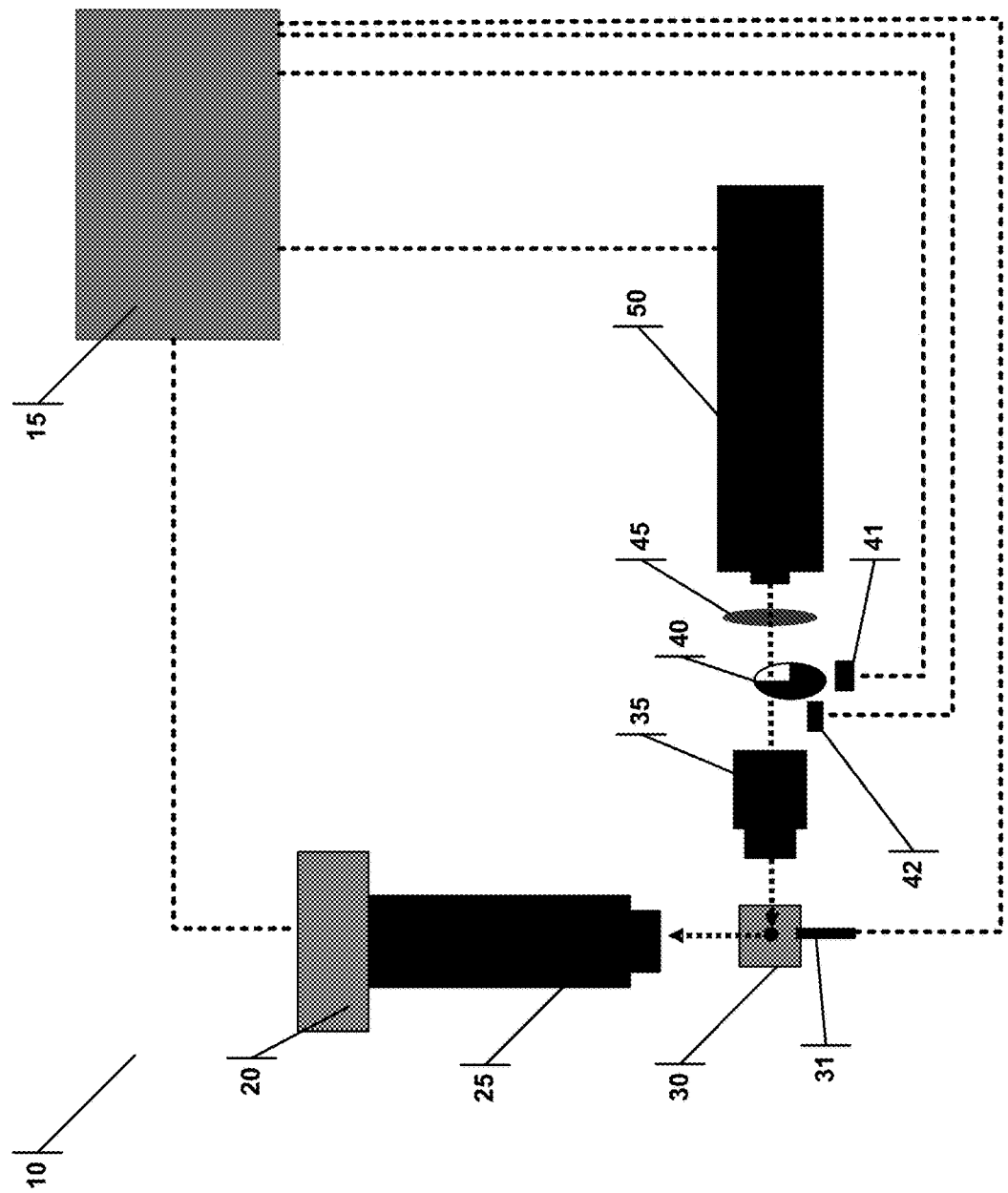
FIG. 1 illustrates a system for detecting particle sizes in a colloid using an optical chopper.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with the attached figures and is provided for ease of reference, where like reference numerals designate corresponding features throughout the specification and figures:

| | |
|---|---|
| System | 10 |
| Controller/Processor | 15 |
| Sensor/Camera | 20 |
| Microscope/Imaging Objective | 25 |
| Sample Container/Cuvette/Specimen Chamber | 30 |
| Temperature Sensor | 31 |
| Objective | 35 |
| Optical Chopper | 40 |
| Chopper Motor | 41 |
| Detector | 42 |
| Lens | 45 |
| Light Source/Laser | 50 |
| Rotating Structure (Disc) | 55 |
| Axis of Rotation | 60 |
| Rotational Direction | 62 |
| First Filter | 65 |
| Second Filter | 70 |
| Third Filter | 75 |
| Synchronization Marks/Structures | 80 |
| Magnet | 85 |
| Method | 1000 |
| Steps of method | 1005-1048 |

With reference to FIG. 1, the present invention provides a system 10 for determining particles sizes within a colloid. The system 10 comprises a light source 50, a sensor or camera 20, an optical chopper 40, a detector 42, and a controller or processor 15. The controller or processor 15 is in communication with and is connected to the sensor 20, the light source 50, the optical chopper 40, and the detector 42 and can activate and/or deactivate these components and read and store the outputs of these components.

The light source 50 is constructed to direct a beam of electromagnetic radiation at a specimen chamber or a sample container 30, which contains a temperature sensor 31 that reports the temperature of the diluent. The beam of electromagnetic radiation from the light source 50, which may be a laser, may pass through a lens or set of lenses 45 to be directed first onto the optical chopper 40, then may pass from the optical chopper 40, to be focused onto the sample container or the specimen chamber 30 through an objective 35 or a set of objectives 35. The system 10 may optionally include a light sheet former (not pictured) positioned between the light source 50 and the specimen chamber 30 that forms the light beam(s) from the light source 50 into a sheet of electromagnetic radiation directed at the specimen chamber 30. The sample container or specimen chamber 30 is constructed to allow a portion of the beam to scatter when the particles are illuminated. The sensor 20 is positioned to detect the scatter of the beam in the specimen chamber 30, with a frame rate that may be adjusted by the controller or processor 15. The system 10 may optionally include an imaging objective 25 that focuses the scattered portion of the beam from the light source 50 after it passes through the specimen chamber 30 onto the sensor 20. This optional imaging objective 25 may be part of a microscope. The sensor/camera 20 may be a CCD or a camera capable of capturing color images, or it may optionally be a black and white camera.

Figure 2:
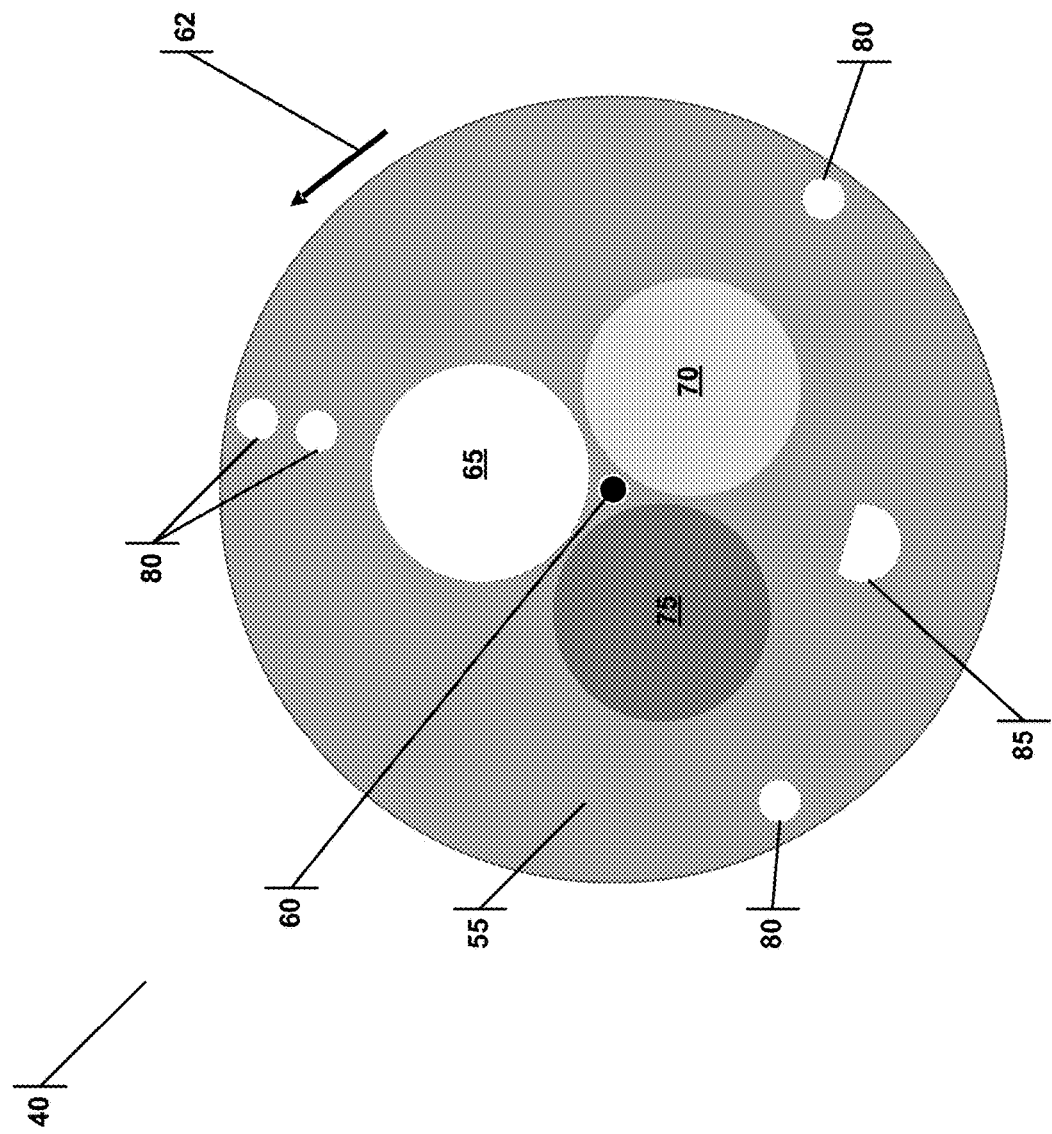
FIG. 2 illustrates an optical chopper.

The optical chopper 40, which is positioned in between the specimen chamber 30 and the light source 50, as shown in FIG. 1, is shown in more detail in FIG. 2. The optical chopper 40 comprises a rotation structure 55 adapted to rotate, a motor 41 connected to the controller/processor 15, which moves or rotates the rotation structure 55 about an axis of rotation 60. The rotation structure 55 may be shaped like a disc, as illustrated in FIG. 2. The rotation structure 55 itself comprises a first filter 65 and a second filter 75. The filters differ in that the first filter 65 permits a different amount or a different type of electromagnetic radiation to pass through than does the second filter 75. Also integrated into the optical chopper 40 are one or more synchronization mark(s) or structure(s) 80 constructed to indicate the rotational position of the rotation structure 55. The optical chopper 40 is to be used alongside a detector 42, which is constructed to detect the position of the synchronization mark/structure 80; the processor 15 can use the information from the detector 42 to control the motor 41, and thus control the rotational direction 62 and the rotational speed of the rotation structure 55. With the information from the detector 42 about the position of the synchronization marks/structures 80, the processor 15 can also determine the appropriate frame rate for the sensor 20, which captures images based on the rotational speed and rotational position of the optical chopper 40. During initial set up of the system 10, the optical chopper 40 can additionally employ a locking structure to maintain the rotational position of the rotation structure 55, and the locking structure of the optical chopper 40 may, as a non-limiting example, comprise a magnet or electromagnet 85. With the optical chopper 40 locked, the system 10 can be set up, and when the system 10 is operational, the lock can be disengaged to allow the optical chopper 40 to rotate.

It is an objective of the present invention to solve the problem of wildly varying scattered light intensities, caused by a wide range of particle sizes in the colloid studied. The solution provided by the present invention is to allow for fast changes in the level of intensity of the light focused onto the specimen under study, and to synchronize those light intensity changes to the frame rate of the sensor 20 picking up the scattered light from the specimen under study. Thus, particles of a first size may be studied using a first beam intensity, and the particles of a second size may be studied using a second beam intensity. The beam intensities can be alternated in quick succession, so as to enable tracking of the motion of differently sized particles. Instead of using a light source 50 designed specifically to alternate the light beams it emits, the present invention provides a much more efficient and elegant solution of using alternating filters, which are alternated via the controllable rotational motion of the rotation structure 55 on which the filters can be mounted, and then synchronizing the images captured by the sensor 20 based on the rotational position of the optical chopper 40 (and thus which filter was used at the time any particular image was taken). Each filter (65, 70, and 75 in FIG. 2) can filter the light spectrum or the light intensity to optimize detection of a particular size range of particles. As a non-limiting example, the first filter 65 may allow for the transmission of greater than 80% of the light beam intensity, and the second filter 70 may allow for less than 80% of the light beam intensity to be transmitted, e.g. 50% or 10% of the light intensity from the light source 50. The rotation structure 55 of the optical chopper 40 may have two filters 65, 70 or more than two filters, each of which permits a different amount or type of electromagnetic radiation to pass through. As the rotation structure 55 rotates, the beam of electromagnetic radiation from the light source 50 alternates between passing through each of the filters. The light source 50 may be monochromatic, i.e. a laser, with the filters in the optical chopper 40 being light intensity filters; alternatively, the light source 50 may be polychromatic, with the filters in the optical chopper being chromatic filters. The synchronization marks/structures 80 may be placed in line with the position of the filters, as illustrated in FIG. 2, or placed in between the filters to delineate the transition between filters.

The processor 15 has a crucial role in operating the system 10 to achieve the objective of accurately determining the size of differently-sized nanoparticles, and concentrations of any given size of nanoparticle, in a sample or specimen. The processor 15 is connected to the light source 50, the sensor 20, the detector 40, and the optical chopper 40, the temperature sensor 31 and is configured to perform the steps of the method 1000. The method 1000 employed by the processor 15 is described as discrete steps 1005-1048 in FIGS. 3A and 3B. The system 10, wherein the processor 15 is configured to perform the steps in FIG. 3A, may be considered one embodiment, and the system 10 with the processor configured to perform the steps in FIG. 3B may be considered another embodiment. Although the steps in FIGS. 3A-3B indicate the use of two filters, it would be obvious to one skilled in the art how to modify the steps of the method 1000 to incorporate the use of more than two filters, without departing from the scope and spirit of this disclosure.

Figure 3A:
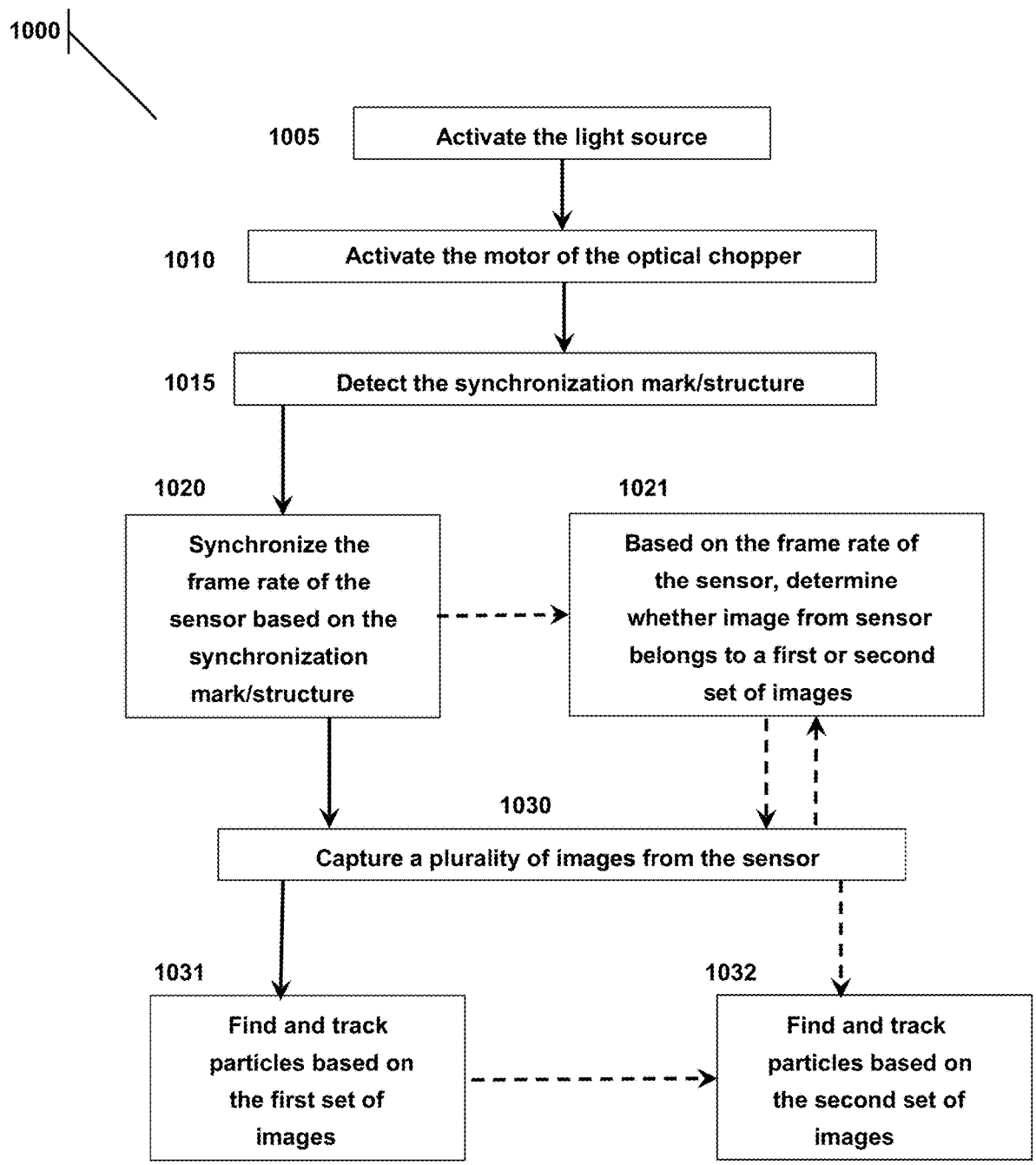
FIG. 3A is a flow chart detailing a first method of using an optical chopper to rapidly adjust the intensity of light incident on a colloid under investigation.

In FIG. 3A, the method 1000 executed by the processor 15 starts off with activating the light source 50 (step 1005), activating the motor 41 (step 1010) to rotate the rotation structure 55, and detecting the synchronization mark/structure 80 (step 1015) using the detector 42 to determine the rotational position of the rotation structure 55 of the optical chopper 40. Next, the processor 15 synchronizes the frame rate of the sensor 20 based on the information about the synchronization mark or structure 80 provided by the detector 42 to the processor 15 (step 1020). The detector 42 may continuously track the synchronization mark(s) or structure(s) 80 or (equivalently) may provide time information about when the synchronization mark(s) or structure(s) 80 passed a fixed point, with which the processor 15 can determine the location of the synchronization mark/structure 80. After step 1020, the processor 15 moves on to step 1030, capturing a plurality of images from the sensor 20.

The step 1020 of synchronizing the frame rate of the sensor 20 may further comprise the step 1021, synchronizing the frame rate for the sensor 20 such that a first set of images from the plurality corresponds to the detection of the scatter of the beam passing through the first filter 65, and a second set of images from the plurality corresponds to the detection of scatter of the beam passing through the second filter 70. In other words, in step 1021, the processor 15 determines whether the image reading from the sensor 20 at that moment would belong to a first set of images that was taken when the beam was passing through the first filter 65, or to a second set of images that was taken when the beam was passing through the second filter 70. Alternatively, step 1021 may be operated in tandem or in parallel with step 1030, as the sensor 20 captures a plurality of images. After step 1030, wherein the processor 15 captures a plurality of images from the sensor 20, the processor 15 then can find and track particles of a first size based on a first set of images that was taken from the sensor 20 when the beam was passing through the first filter at a first intensity level (step 1031). Then, the processor 15 can find and track particles of a second size based on a second set of images that was taken from the sensor 20 when the beam was passing through the second filter (step 1032). The first set of images and the second set of images may provide information about different sizes of particles, and the processor 15 can integrate the information from steps 1031 and 1032, so that the sizes of the particles in the sample contained within the specimen chamber 30 can be determined. Moreover, instead of performing the steps 1031 and 1032 in succession, the processor 15 may perform the steps 1031 and 1032 in parallel.

The videos (i.e., the first set of images and the second set of images) are processed to find and track all particles detected on each video, the positions of same particle on each of three (or other number) videos being same and thus allowing for not over-counting particles for concentration measurements. By using general theory of optimized track lengths (cf. e.g. X. Michalet and A. J. Berglund 2012 Phys Rev E85, 06916, 1-14 *Optimal diffusion coefficient estimation in single-particle tracking*), the processor can obtain accurate size of each particle being tracked given the temperature and viscosity of diluent of the measured sample. The temperature of cuvette 30 may further be recorded during image acquisition from the temperature sensor 31. The viscosity of typical diluents like water or PBS (phosphate-buffered saline) are well known for known temperatures. If the viscosity of the diluent is not known, it can be measured by spiking diluent with a known size of beads and processing recorded images as if the viscosity was that of water—the change of the ratio between the measured and the known size of beads used is equal to the ratio of the unknown viscosity of the diluent to the viscosity of water at given temperature.

Figure 3B:
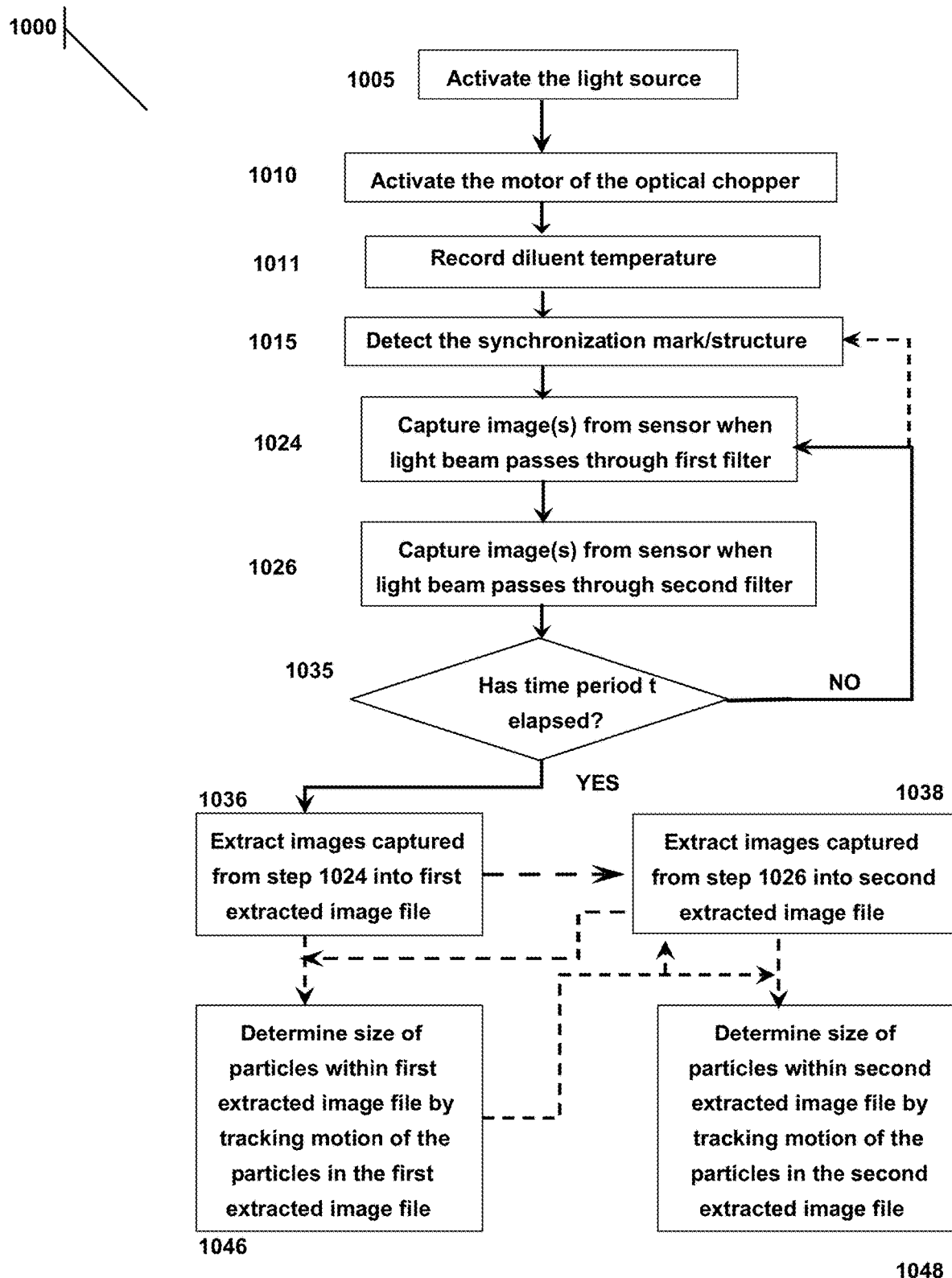
FIG. 3B is a flow chart detailing a second method of using an optical chopper to detect the size of particles in a colloid under investigation.

FIG. 3B shows a second method 1000 for the system 10. The processor 15 performs the same steps of activating the light source 50 (step 1005) and activating the motor 41 of the optical chopper 40 (step 1010). The processor 15 next records the diluent temperature (step 1011), and then detects the synchronization mark or structure 80 (step 1015). Next, the processor 15 performs step 1024, capturing image(s) from the sensor 20 when the light beam from the light source 50 passes through the first filter 65, the time frame of which can be determined based on the information provided by the detector 42 to the processor 15 in the earlier step of 1015. Then, the processor 15 performs step 1026, capturing image(s) from the sensor 20 when the light beam from the light source 50 passes through the second filter 70, the time frame of which can also be determined based on the information provided in step 1015. After steps 1024 and 1026, the processor 15 makes a determination of whether a predetermined time period t has elapsed, repeating steps 1024 and 1026 until the expiration of that time period t (step 1035). The time period t may depend in part upon the rotational speed and the rotational position of the optical chopper 40 that is determined by the detector 42 via the synchronization mark(s)/structure(s) 80. The processor 15 may loop through steps 1024, 1026, and 1035 until the expiration of the time period occurs; then, it proceeds to step 1036.

In step 1036, the processor 15 extracts images captured from iterations of step 1024 into a first extracted image file, and in step 1038, the processor 15 extracts images captured from iterations of step 1026 into a second extracted image file. The processor 15 can then determine the size of particles within the first extracted image file by tracking the motion of the particles within the first extracted image file in step 1046. The processor 15 can next determine the size of particles within the second extracted image file by tracking the motion of the particles within the second extracted image file in step 1048. Note that in the method 1000 disclosed by FIG. 3B, when it comes to steps 1036-1048, there is some flexibility in the order in which the steps are performed, as long as the corresponding size of particles is determined following the extraction of images to the image file. Thus, these steps may be executed in the sequence of 1036, 1038, 1046, and 1048 or, for example, in the sequence of 1036, 1046, 1038, and 1048. Furthermore, there is also flexibility in the time that elapses between the steps of image extraction (1036 and 1038) and the steps of determining particle size (1046 and 1048). The processor 15 of the system 10 may, for instance, capture and extract many series of images in steps 1024-1038 before processing the extracted images to determine the size of particles in steps 1046 and 1048 without departing from the spirit and scope of this invention. Step 1035 can also be implemented with the variation to repeat steps 1015, 1024, and 1026 instead of steps 1024 and 1026. Doing so would give the advantage of increased accuracy from having more frequent readings of the synchronization mark(s) or structure(s) 80, at the cost of increased processing time to execute step 1015 in the loop until the time period has transpired.

The system 10 that has been disclosed in conjunction with FIGS. 1 and 2, where the processor 15 is configured to perform the steps provided in either FIG. 3A or FIG. 3B, may include a rotation structure 55 that has more than two filters, each of which permits a different amount or type of electromagnetic radiation to pass through, and as the rotation structure 55 rotates, the beam of electromagnetic radiation from the light source 50 to the specimen chamber 30 alternates between passing through each of the filters. As stated before, a first filter may allow for the transmission of greater than 80% of the light beam intensity from the light source 50, and the second filter may allow for the transmission of less than 80% of the light beam intensity.

Either embodiment may further comprise an imaging objective 25 that focuses the scattered portion of the light beam passing through the specimen chamber 30 onto the sensor 20, and either embodiment may further comprise a light sheet former that forms the beams from the light source 50 into a sheet of electromagnetic radiation directed at the specimen chamber 30, either before or after the beams pass through the optical chopper 40. The sensor 20 may optionally be a black and white camera, and the light source 50 may also optionally be a laser. The optical chopper 40 may comprise a locking structure to maintain the rotational position and stability of the rotation structure 55, and this locking structure may comprise a magnet 85.

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

The invention claimed is:

1. A system for determining the particle sizes within a colloid, the system comprising:
   a light source constructed to direct a beam of electromagnetic radiation at a specimen chamber, the chamber constructed to allow a portion of the beam to scatter when illuminating particles within the chamber;
   a sensor positioned to detect the scatter of the beam, the sensor having a frame rate;
   an optical chopper positioned between the specimen chamber and the light source, the optical chopper comprising:
      a rotation structure adapted to rotate comprising a first filter and a second filter, wherein the first filter permits a different amount or a different type of electromagnetic radiation to pass through than does the second filter;
      a motor adapted to rotate the rotation structure;
      a synchronization mark or structure constructed to indicate the rotational position of the rotation structure;
      wherein, as the rotation structure rotates, the beam of electromagnetic radiation alternates between passing through the first filter and the second filter;
   a detector constructed to detect the position of the synchronization mark or structure;
   a processor connected to the light source, the sensor, the detector, and the optical chopper, the processor configured to perform the following steps:
      A. activating the light source;
      B. activating the motor;
      C. detecting the synchronization mark or structure;
      D. synchronizing the frame rate of the sensor based on the synchronization mark or structure detection; and
      E. capturing a plurality of images from the sensor.

2. The system of claim 1, wherein step (D) further comprises synchronizing the frame rate of the sensor such that a first set of images from the plurality corresponds to the detection of the scatter of the beam passing through the first filter, and a second set of images from the plurality corresponds to the detection of the scatter of the beam passing through the second filter.

3. The system of claim 2, wherein the processor performs the following steps:
   F. finding and tracking particles based on the first set of images; and
   G. finding and tracking particles based on the second set of images.

4. The system of claim 3, wherein the processor determines the sizes of the particles based on steps (F) and (G).

5. The system of claim 1, wherein the rotation structure has more than two filters, each of which permits a different amount or type of electromagnetic radiation to pass through, and as the rotation structure rotates, the beam of electromagnetic radiation alternates between passing through each of the filters.

6. The system of claim 1, wherein the light source is monochromatic, and the filters are intensity filters.

7. The system of claim 1, wherein the light source is polychromatic, and the filters are chromatic filters.

8. The system of claim 1, wherein the first filter allows for the transmission of greater than 80% of the light beam intensity, and the second filter allows for the transmission of less than 80% of the light beam intensity.

9. The system of claim 1, further comprising an imaging objective that focuses the scattered portion of the beam onto the sensor.

10. The system of claim 1, wherein the sensor is a black and white camera.

11. The system of claim 1, wherein the light source is a laser.

12. The system of claim 1, further comprising a light sheet former that forms the beams into a sheet of electromagnetic radiation directed at the specimen chamber.

13. The system of claim 1, wherein the optical chopper comprises a locking structure to maintain the rotational position of the rotation structure.

14. The system of claim 13, wherein the locking structure comprises a magnet.

15. A system for determining the particle sizes within a colloid, the system comprising:
   a light source constructed to direct a beam of electromagnetic radiation at a specimen chamber, the chamber constructed to allow a portion of the beam to scatter when illuminating particles within the chamber;
   a sensor positioned to detect the scatter of the beam, the sensor having a frame rate;
   an optical chopper positioned between the specimen chamber and the light source, the optical chopper comprising:
      a rotation structure adapted to rotate, comprising a first filter and a second filter, wherein the first filter permits a different amount or type of electromagnetic radiation to pass through than the second filter;
      a motor adapted to rotate the rotation structure;
      a synchronization mark or structure constructed to indicate the rotational position of the rotation structure;
      wherein, as the rotation structure rotates, the beam of electromagnetic radiation alternates between passing through the first filter and the second filter;
   a detector constructed to detect the position of the synchronization mark or structure;
   a processor connected to the light source, the sensor, the detector, and the optical chopper, the processor configured to perform the following steps:
      A. activating the light source;
      B. activating the motor;
      C. detecting the synchronization mark or structure;
      D. capturing an image or images from the sensor when the light beam is passing through the first filter;
      E. capturing an image or images from the sensor when the light beam is passing through the second filter;
      F. repeating steps (D) and (E) until the expiration of a time period;
      G. extracting the images from step (D) into a first extracted image file;

H. extracting the images from step (E) into a second extracted image file;

I. determining the size of particles within the first extracted image file by tracking the motion of the particles within the first extracted image file; and J. determining the size of particles within the second extracted image file by tracking the motion of the particles within the second extracted image file.

16. The system of claim 15, wherein the rotational structure has more than two filters, each of which permits a different amount of electromagnetic radiation to pass through, and as the rotation structure rotates, the beam of electromagnetic radiation alternates between passing through each of the filters.

17. The system of claim 15, wherein the first filter allows for the transmission of greater than 80% of the light beam intensity, and the second filter allows for the transmission of less than 80% of the light beam intensity.

18. The system of claim 15, further comprising an imaging objective that focuses the scattered portion of the beam onto the sensor.

19. The system of claim 15, wherein the sensor is a black and white camera.

20. The system of claim 15, wherein the light source is a laser.

21. The system of claim 15, further comprising a light sheet former that forms the beams into a sheet of electromagnetic radiation directed at the specimen chamber.

22. The system of claim 15, wherein the optical chopper comprises a locking structure to maintain the rotational position of the rotation structure.

23. The system of claim 22, wherein the locking structure comprises a magnet.

24. The system of claim 15, wherein the processor is configured in step (F) to repeat steps (C), (D), and (E) until the expiration of a time period.

\* \* \* \* \*